(12) United States Patent
Renzullo et al.

(10) Patent No.: US 10,103,955 B2
(45) Date of Patent: Oct. 16, 2018

(54) METHODS, SYSTEMS, AND COMPUTER READABLE MEDIA FOR TRANSMITTING DIAMETER PEER STATUS INFORMATION

(71) Applicant: Oracle International Corporation, Redwood Shores, CA (US)

(72) Inventors: Jared Michael Renzullo, Hudson, MA (US); Tarek Assali, Wellesley, MA (US); Sayan Chowdhury, Waltham, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 14/873,112

(22) Filed: Oct. 1, 2015

(65) Prior Publication Data
US 2017/0099202 A1    Apr. 6, 2017

(51) Int. Cl.
    *H04L 12/26*      (2006.01)
(52) U.S. Cl.
    CPC .......... *H04L 43/0811* (2013.01); *H04L 43/06* (2013.01)
(58) Field of Classification Search
    CPC .............................. H04L 43/0811; H04L 43/06
    USPC ....................................................... 709/224
    See application file for complete search history.

(56) References Cited

U.S. PATENT DOCUMENTS

| | | | |
|---|---|---|---|
| 4,532,625 A * | 7/1985 | Stover | H04Q 3/0016 370/225 |
| 7,756,029 B2 | 7/2010 | Licardie et al. | |
| 7,881,185 B1 | 2/2011 | Karl et al. | |
| 7,912,091 B1 | 3/2011 | Krishnan et al. | |
| 8,081,620 B2 | 12/2011 | Rouyer et al. | |
| 8,402,132 B2 * | 3/2013 | Kang | H04L 63/0892 709/224 |
| 8,468,267 B2 | 6/2013 | Yigang et al. | |

(Continued)

FOREIGN PATENT DOCUMENTS

| | | |
|---|---|---|
| CN | 104335539 B | 7/2017 |
| CN | ZL 201380027543.6 | 7/2017 |

(Continued)

OTHER PUBLICATIONS

Non-Final Office Action for U.S. Appl. No. 14/927,377 (dated Mar. 22, 2017).

(Continued)

*Primary Examiner* — Thomas J Dailey
*Assistant Examiner* — Lam H Duong
(74) *Attorney, Agent, or Firm* — Jenkins, Wilson, Taylor & Hunt, P.A.

(57) ABSTRACT

Methods, systems, and computer readable media for transmitting Diameter peer status information are disclosed. According to one method, the method occurs at a first Diameter node. The method includes determining Diameter peer status information for Diameter peer nodes, wherein the Diameter peer status information includes connection statuses for each of the Diameter peer nodes. The method also includes generating, using group related information indicating a masking order for the connection statuses, a mask indicating the connection statuses, wherein each of the connection statuses is indicated by a value stored in a different position in the mask and sending the mask to a second Diameter node.

18 Claims, 4 Drawing Sheets

(56) References Cited

U.S. PATENT DOCUMENTS

| | | |
|---|---|---|
| 8,566,474 B2 | 10/2013 | Kanode et al. |
| 8,601,073 B2 | 12/2013 | Craig et al. |
| 8,613,073 B2 | 12/2013 | McCann et al. |
| 8,644,156 B2 | 2/2014 | Rai et al. |
| 8,761,005 B2 | 6/2014 | Subramanian |
| 8,879,431 B2 | 11/2014 | Ridel et al. |
| 9,088,478 B2 | 7/2015 | Craig et al. |
| 9,094,293 B2 | 7/2015 | Liang |
| 9,699,045 B2 | 7/2017 | Roach et al. |
| 2003/0200277 A1 | 10/2003 | Kim |
| 2005/0232407 A1 | 10/2005 | Craig et al. |
| 2008/0240133 A1 | 10/2008 | Tanaka |
| 2008/0250156 A1 | 10/2008 | Agarwal et al. |
| 2009/0083861 A1 | 3/2009 | Jones |
| 2009/0265467 A1 | 10/2009 | Peles |
| 2010/0265831 A1 | 10/2010 | Hachiya et al. |
| 2010/0299451 A1 | 11/2010 | Yigang et al. |
| 2011/0040845 A1 | 2/2011 | Cai et al. |
| 2011/0061061 A1 | 3/2011 | Chen et al. |
| 2011/0199906 A1* | 8/2011 | Kanode ............... H04L 63/0892 370/235 |
| 2011/0202676 A1* | 8/2011 | Craig .................... H04L 45/306 709/238 |
| 2012/0036246 A1* | 2/2012 | Marsico .............. H04L 41/0654 709/223 |
| 2013/0121141 A1 | 5/2013 | Hao |
| 2013/0275583 A1 | 10/2013 | Roach et al. |
| 2014/0269255 A1 | 9/2014 | Zeng et al. |
| 2015/0271103 A1 | 9/2015 | Thayalan et al. |
| 2015/0271708 A1* | 9/2015 | Zaus ..................... H04W 76/18 370/230 |
| 2017/0126478 A1 | 5/2017 | Morris |
| 2018/0062977 A1 | 3/2018 | Mahalank et al. |

FOREIGN PATENT DOCUMENTS

| | | |
|---|---|---|
| EP | 2 280 520 A1 | 2/2011 |
| EP | 2 466 832 A1 | 6/2012 |
| JP | 2011/166737 A | 8/2011 |
| JP | 6059336 | 1/2017 |
| KR | 10-2009-0029348 | 3/2009 |
| WO | WO 2009/070179 A1 | 6/2009 |
| WO | WO 2012/119147 A1 | 9/2012 |
| WO | WO 2013/155535 A1 | 10/2013 |

OTHER PUBLICATIONS

Commonly-assigned, co-pending U.S. Appl. No. 14/927,377 for "Methods, Systems, and Computer Readable Media for Using Link Aggregation Group (LAG) Status Information," (Unpublished, filed Oct. 29, 2015).

Fajardo et al., "Diameter Base Protocol," RFC 6733, pp. 1-152 (Oct. 2012).

Wang et al., "OpenFlow-Based Server Load Balancing Gone Wild," https://www.usenix.org/legacy/event/hotice11/tech/full_papers/Wang_Richard.pdf, pp. 1-6, (2011).

Final Office Action for U.S. Appl. No. 14/927,377 (dated Jul. 19, 2017).

Advisory Action for U.S. Appl. No. 14/927,377 (dated Dec. 1, 2017).

Applicant-Initiated Interview Summary for U.S. Appl. No. 14/927,377 (dated Apr. 20, 2018).

Non-Final Office Action for U.S. Appl. No. 14/927,377 (dated Jan. 12, 2018).

Applicant Initiated Interview Summary for U.S. Appl. No. 14/927,377 (dated Dec. 15, 2017).

Letter Regarding Decision to Grant Chinese Patent Application No. ZL201380027543.6 (dated May 3, 2017).

Notice of Allowance and Fee(s) Due for U.S. Appl. No. 13/863,351 (dated Apr. 20, 2017).

Letter regarding notice of grant for Japanese Patent Application No. 2015/505985 (dated Nov. 29, 2016).

Applicant-Initiated Interview Summary for U.S. Appl. No. 13/863,351 (dated Nov. 9, 2016).

Notification of the First Office Action for Chinese Patent Application No. 201380027543.6 (dated Sep. 30, 2016).

Letter regarding Office Action for Japanese Patent Application No. 2015-505985 (dated Sep. 6, 2016).

Final Office Action for U.S. Appl. No. 13/863,351 (dated Aug. 26, 2016).

Applicant-Initiated Interview Summary for U.S. Appl. No. 13/863,351 (dated May 27, 2016).

Non-Final Office Action for U.S. Appl. No. 13/863,351 (dated Mar. 17, 2016).

Extended European Search Report for European Application No. 13776083.1 (dated Dec. 14, 2015).

Advisory Action for U.S. Appl. No. 13/863,351 (dated Nov. 25, 2015).

Final Office Action for U.S. Appl. No. 13/863,351 (dated Sep. 11, 2015).

Non-Final Office Action for U.S. Appl. No. 13/863,351 (dated Mar. 27, 2015).

Communication of European publication number and information on the application of Article 67(3) EPC for European Application No. 13776083.1 (dated Jan. 21, 2015).

Notification of Transmittal of the International Search Report and the Written Opinion of the International Searching Authority, or the Declaration for International Application No. PCT/US2013/036664 (dated Jul. 2, 2013).

Calhoun et al., "Diameter Base Protocol," RFC 3588, pp. 1-147 (Sep. 2003).

Aboba et al., "Authentication, Authorization and Accounting (AAA) Transport Profile," RFC 3539, pp. 1-41 (Jun. 2003).

Notice of Allowance and Fee(s) Due and Examiner-Initiated Interview Summary for U.S. Appl. No. 14/927,377 (dated Jun. 26, 2018).

Notice of Allowance and Fee(s) Due and Examiner-Initiated Interview Summary for U.S. Appl. No. 15/251,835 (dated Jul. 20, 2018).

* cited by examiner

| GROUP ID | GROUP MEMBERS (E.G., ORDERED LIST) | STATUS INFORMATION (E.G., BITMASK) |
|---|---|---|
| DRA1-1 | PCRF1.EX.COM<br>PCRF2.EX.COM<br>PCRF3.CC.COM<br>PCRF4.CC.COM | 0110 |
| DRA1-2 | PCEF1.EX.COM<br>PCEF2.EX.COM | 11 |
| DRA2-1 | PCRF1.EX.COM<br>PCRF2.EX.COM<br>PCRF3.CC.COM<br>PCRF4.CC.COM<br>PCEF3.CC.COM<br>PCEF4.CC.COM | 011101 |

METHODS, SYSTEMS, AND COMPUTER READABLE MEDIA FOR TRANSMITTING DIAMETER PEER STATUS INFORMATION

TECHNICAL FIELD

The subject matter described herein relates to Diameter communications. More specifically, the subject matter relates to methods, systems, and computer readable media for transmitting Diameter peer status information.

BACKGROUND

The Diameter protocol is a next generation authentication, authorization, and accounting (AAA) protocol. The Diameter base protocol is defined in IETF RFC 6733, the disclosure of which is incorporated by reference herein in its entirety. Commonly used within the Internet protocol (IP) multimedia subsystem (IMS) architecture, the Diameter protocol was derived from the remote authentication dial-in user service (RADIUS) protocol. However, while RADIUS is based on UDP which is connectionless and unreliable transport, Diameter is based on reliable connection oriented transport (TCP and SCTP). Congestion and other communication issues (e.g., link failure) can prevent or hinder Diameter messages from reaching an appropriate destination. If a Diameter request message or a corresponding answer message is lost or undelivered, problems can arise. For example, Diameter messages may be used to authenticate subscribers for service access. If subscribers are not authenticated, the subscribers may be denied service access. Hence, to reduce problems associated with Diameter message delivery, it is important that Diameter nodes are made aware of Diameter peer status information, such as node availability information, path availability information, and congestion information.

Accordingly, there exists a need for methods, systems, and computer readable media for transmitting Diameter peer status information.

SUMMARY

Methods, systems, and computer readable media for transmitting Diameter peer status information are disclosed. According to one method, the method occurs at a first Diameter node. The method includes determining Diameter peer status information for Diameter peer nodes, wherein the Diameter peer status information includes connection statuses for each of the Diameter peer nodes. The method also includes generating, using group related information indicating a masking order for the connection statuses, a mask indicating the connection statuses, wherein each of the connection statuses is indicated by a value stored in a different position in the mask and sending the mask to a second Diameter node.

According to one system, the system includes a first Diameter node. The first Diameter node includes a processor and a memory. The first Diameter node is configured to determine Diameter peer status information for Diameter peer nodes, wherein the Diameter peer status information includes connection statuses for each of the Diameter peer nodes, to generate, using group related information indicating a masking order for the connection statuses, a mask indicating the connection statuses, wherein each of the connection statuses is indicated by a value stored in a different position in the mask, and to send the mask to a second Diameter node.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory. For example, a node may include a virtual machine and/or other software executing on a physical computing platform.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating Diameter peer status information according to an embodiment of the subject matter described herein;

DETAILED DESCRIPTION

Figure 1:
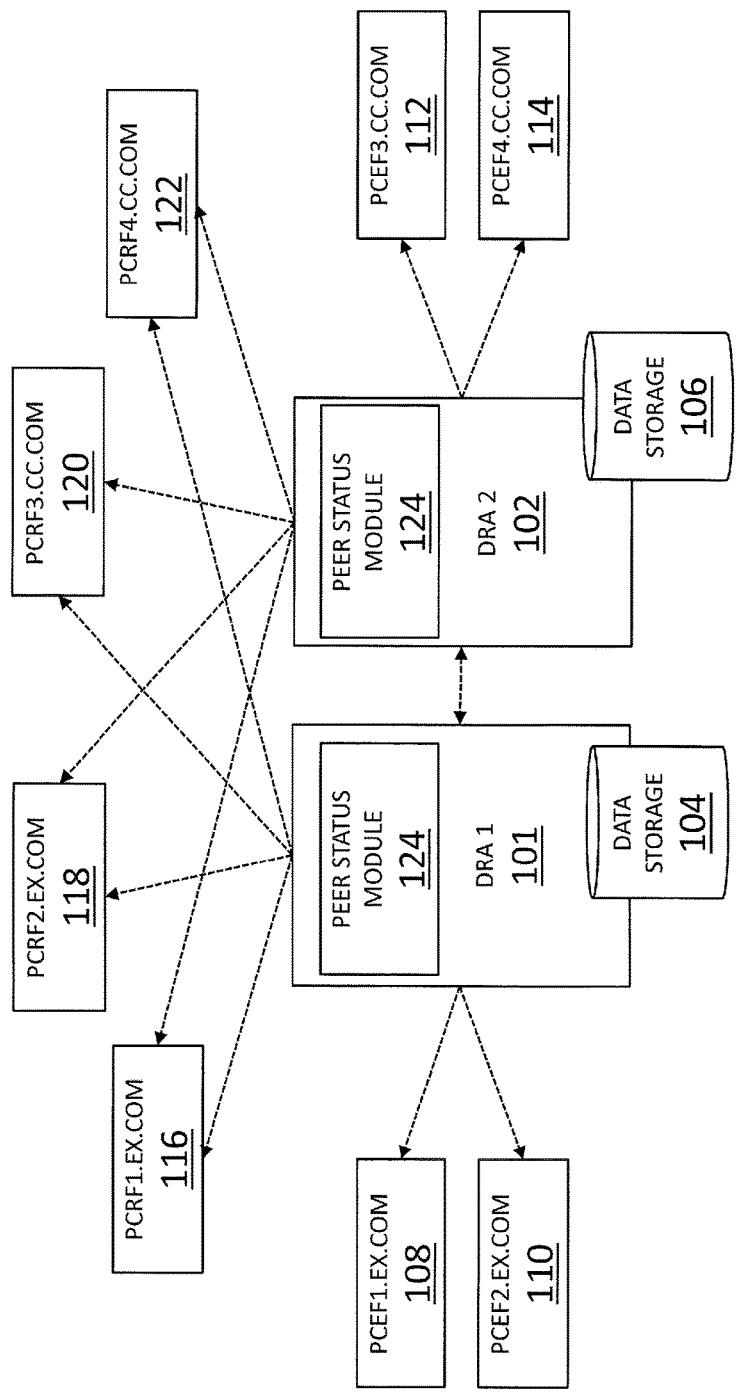
FIG. 1 is a diagram illustrating a Diameter network according to an embodiment of the subject matter described herein.

The subject matter described herein relates to methods, systems, and computer readable media for transmitting Diameter peer status information. Generally, when routing certain Diameter requests, there can be a Diameter connection failure between any hops along the path which will cause the request to fail. For example, if a Diameter request message from a policy and charging rules function (PCRF) traverses a Diameter routing agent (DRA) on its way to a packet gateway (PGW), the link (e.g., a physical or virtual connection) between the PCRF and DRA and/or the link between the DRA and PGW could be down. One way to alleviate problems associated with connection failures downstream is to try re-routing the Diameter request message by responding with an error whenever a connection failure is encountered. However, this approach can be quite complex. In addition, it will increase the overall transaction latency. Another approach is to try to determine ahead of time which route will succeed by transmitting the current status of Diameter connections between all peers in the network. For example, each Diameter node in the network may send status information regarding each Diameter identity it is currently connected to. However, scalability and resource efficiency become issues if a server has connections to thousands of Diameter identities, which may involve transmitting a large amount of information.

In accordance with some aspects of the subject matter described herein, techniques, methods, or mechanisms are disclosed for associating Diameter entities into groups. For example, a group may include related elements (e.g., a single logical PGW which has multiple identities or fully qualified domain names (FQDNs)). In another example, a group may include unrelated elements or entities (e.g., an entire network could be represented by a single group). In some embodiments, group related information may include the name of the group and an ordered list of group member identities (e.g., a list of identities or FQDNs. By grouping Diameter nodes, Diameter peer status information may be sent in fewer messages (e.g., a single message with statuses of a plurality of Diameter node) than conventional techniques, while also providing some granularity and/or control over the amount of Diameter peer status information being transmitted. Further, by grouping Diameter nodes, a recipient list for particular Diameter peer status information may be reduced to interested parties (e.g., instead of broadcasted to all entities in the network); thereby alleviating network traffic associated with extraneous Diameter peer status update messages being sent to uninterested parties.

In accordance with some aspects of the subject matter described herein, techniques, methods, or mechanisms are disclosed for transmitting Diameter peer status information using a mask (also referred to herein as a map). For example, if a group has five group members (e.g., five Diameter nodes), a bitmask or a bitmap may include five bits, where each bit represents a connection status of a different group member. In this example, a bit with a '0' (zero) value may indicate no Diameter connectivity and a bit with a '1' (one) value may indicate Diameter connectivity.

Advantageously, in accordance with some aspects of the subject matter described herein, by using a group and/or a bitmask, the amount of status information that needs to be transmitted amongst Diameter peers in a network can be significantly reduced. For example, by using a bitmask to transmit Diameter peer status information for a particular group of Diameter peer nodes connected to a DRA, transmitting a significant amount of Diameter peer status update messages can be avoided. Further, by transmitting less information, more peers can be monitored which improves the intelligence of dynamic Diameter routing. Further, these and/or related features improves scalability, thereby allowing large deployments to share Diameter peer status information without negatively impacting performance. In contrast, systems without such features must limit which peers can be monitored and/or what Diameter peer status information is shared, which can reduce the efficacy of such systems.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating a Diameter network 100 according to an embodiment of the subject matter described herein. Diameter network 100 may represent any network that uses a Diameter protocol and/or includes Diameter entities. Diameter network 100 may include DRAs 101-102, policy and charging enforcement functions (PCEFs) 108-114, policy and charging rules function (PCRFs) 116-122, and/or other entities that use a Diameter protocol or performs a Diameter function. DRAs 101-102 may represent any suitable entities for routing or relaying Diameter signaling messages, e.g., between Diameter entities. DRA 101 may include functionality for processing various messages. DRAs 101-102 may include various communications interfaces for communication with Diameter entities, e.g., 3rd Generation Partnership Project (3GPP) LTE communications interfaces and other (e.g., non-LTE) communications interfaces. In some embodiments, receiving, processing, and/or routing functionality may be included in one or more modules. For example, DRA 101 or DRA 102 may include or have access to one or more modules for receiving Diameter signaling messages associated with multiple different Diameter signaling interfaces, e.g., Gx, Gxx, Rx, Sd, and/or S9.

In some embodiments, Diameter entities may be referred to as Diameter nodes, Diameter clients, and/or Diameter servers. For example, for a given transaction, a Diameter entity may act as a Diameter client and may request Diameter information or Diameter related processing. In another example, a Diameter entity may act as a Diameter server and may provide Diameter information or Diameter related processing in response to a request.

In some embodiments, DRAs 101-102 may interact with Diameter entities via one or more Diameter interfaces. For example, DRA 101 or DRA 102 may receive Diameter messages via various interfaces. DRA 101 may interact with PCEFs 108-114 and PCRFs 116-122. PCEFs 108-114 may represent any suitable entities for requesting and enforcing policy and charging control (PCC) rules. PCRFs 116-122 may represent any suitable entities for determining, generating, and/or providing PCC rules, e.g., via Diameter messages, to PCEFs, e.g., PCEFs 108-114. Various Diameter messages may be communicated between these nodes for policing user traffic associated with various user devices (not shown in FIG. 1).

In some embodiments, Diameter messages may be routed through one or more nodes before reaching their destination. For example, Diameter messages from PCRF1.COM 116 may be traverse one or more DRAs (e.g., DRAs 101-102) before ultimately being sent to PCEF2.EX.COM 110. In another example, DRA 101 may forward or send a message to DRA 102 and DRA 102 may send the message to an appropriate PCEF, e.g., PCEF1.EX.COM 108. In both of these examples, if one or more of the nodes in the route to the destination is down, the message may not reach its destination and attempts to re-route the message via an alternate route may result in excessive delays and may also fail, especially if Diameter nodes (e.g., DRAs 101-102 or PCRFs 116-122) in network 100 lack up-to-date Diameter peer status information.

In some embodiments, functionality for determining and/or transmitting Diameter peer status information may be incorporated into one or more modules, such a peer status module 124. Peer status module 124 may represent any suitable entity or entities (e.g., software executing on a processor, an application-specific integrated circuit (ASIC), and/or a field-programmable gate array (FPGA)) for performing aspects related to determining and/or sending Diameter peer status information. For example, peer status module 124 may be implemented using a special purpose computing device comprising a physical processor and a memory.

In some embodiments, peer status module 124 and/or functionality therein may be located at or utilized by various Diameter entities, such as DRAs 101-102, PCEFs 108-114, and/or PCRFs 116-122, in network 100. For example, peer status module 124 at DRA 101 may be usable for determining Diameter peer status information (e.g., any information usable for route-related decisions, such as connection status information, congestion information, connection priority, or other information) associated with various Diameter peer nodes (e.g., Diameter nodes that are communicatively coupled to DRA 101) and for sending the Diameter peer status information to relevant recipients using a map or mask, such as a bitmask, where a value indicates a connection status associated with a particular Diameter peer node.

In some embodiments, determining Diameter peer status information for one or more Diameter peer nodes may involve sending and receiving 'heartbeat' messages. In such embodiments, peer status module 124 may be configured to determine whether a 'heartbeat' message is not received from a Diameter peer node within a specific time period. If a 'heartbeat' message is not received from a Diameter node within a specific time period, the status of the Diameter node may be considered unavailable. Otherwise, in such embodiments, if a 'heartbeat' message is received from a Diameter node within the specific time period, the status of the Diameter node may be considered available.

In some embodiments, sending Diameter peer status information to relevant recipients using a mask may involve grouping Diameter peer nodes into one or more groups based on a network operator, a location, a Diameter function, a uniform resource identifier portion, a domain, a realm, or a network. For example, peer status module 124 may determine and send Diameter peer status information for a group of one or more PCEFs. In this example, by utilizing groups, peer status module 124 may send Diameter peer status information for multiple Diameter peer nodes, while also providing some granularity over the amount of information being sent and the potential or relevant recipients, thereby providing a scalable mechanism for transmitting Diameter peer status information.

In some embodiments, prior to or concurrently with sending Diameter peer status information, peer status module 124 and/or functionality therein may send group related information to a Diameter entity for determining how to process, determine, or derive the Diameter peer status information from the mask. For example, peer status module 124 and/or functionality therein may send group related information including a group identifier and an ordered list of URIs indicating various Diameter peer nodes in a group. In this example, the ordered list may indicate which value in a mask represents the status of a particular Diameter peer node.

Each of data storages 104-106 may represent any suitable entity (e.g., a non-transitory computer readable medium, embedded memory, or a memory device) for storing data associated with transmitting Diameter peer status information. Data storages 104-106 may store associations between group identifiers and group member identifiers. Data storages 104-106 may also include Diameter peer status information associated with one or more groups.

In some embodiments, each of data storages 104-106 may be accessible by DRAs 101, DRA 102, and/or other entities. In some embodiments, each of data storages 104-106 may be located on a single device or computing platform or may be distributed across multiple devices or computing platforms.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

FIG. 2 is a diagram illustrating Diameter peer status information 200 according to an embodiment of the subject matter described herein. Diameter peer status information 200 may represent any information associated with transmitting Diameter peer status information, such as group identifiers, group member identifiers, status and/or connectivity information (e.g., masks (e.g., maps), bitmasks, byte masks, etc.), and/or recipients for receiving Diameter peer status information. In some embodiments, Diameter peer status information 200 may be accessed and/or stored by DRA 101, DRA 102, and/or peer status module 124. In some embodiments, Diameter peer status information 200 may be stored in data storage 104 and/or data storage 106 using various data structures.

Referring to FIG. 2, Diameter peer status information 200 may include associations between group identifiers, group members, and related status information and may be depicted using a table. For example, a table representing Diameter peer status information 200 may comprise columns and/or fields for a group identifier, group member identifiers, status information (e.g., represented using masks, bitmasks, byte masks, etc.), and/or recipients.

A group identifier field may comprise a value, a name, and/or a related identifier for indicating a group of Diameter entities or nodes. For example, a group ID may include a unique number or name. In FIG. 2, each group identifier indicates the Diameter entity that compiles or obtains the Diameter peer status information (e.g., 'DRA1') and a unique number for identifying that group at the obtaining entity (e.g., '1') separated by a dash, e.g., 'DRA1-1', 'DRA1-2', and 'DRA2-1'. In some embodiments, where group related information is only stored for one obtaining Diameter entity, a group identifier may omit information indicating the obtaining entity.

A group members field may comprise one or more values, names and/or identifiers for indicating members (e.g., Diameter entities) associated with a group of Diameter entities. For example, a group members field may include a plurality of URIs for indicating a plurality of Diameter nodes (e.g., PCRF1.COM 116, PCRF2.EX.COM 118, PCRF3.CC.COM 120, and PCRF4.CC.COM 122) associated with a group 'DRA1-1'.

In some embodiments, a group members field may indicate an order related to the group members of a group. For example, a group members field may include an ordered list or another data structure for indicating an order associated with the group members. In this example, the order and/or other group related information may be transmitted to various recipients and used when processing Diameter peer status information.

A status information field may comprise information for indicating status information for one or more Diameter entities. For example, a status information field may include information for indicating whether Diameter connectivity (e.g., the ability for Diameter messages to reach a destination from an origination and vice versa) exists between two nodes. In this example, status information for indicating whether Diameter connectivity exists or does not exists may be stored as a value in a mask, e.g., a bit value in a bitmask.

In some embodiments, a mask or map may represent current status of one or more group members of a group. For example, a mask may include a bitmask, a multi-bitmask, a byte mask, or a multi-byte mask. In this example, a mask may include the same number of values as the number of group members, where each value in the mask (e.g., each bit in the bitmask) may represent a status for a particular group member. Continuing with this example, if a bit is used to represent status or connectivity for a particular group member, the value '0' (zero) may indicate no connectivity and the value '1' (one) may indicate connectivity. In another example, e.g., where values (e.g., bytes, words, multi-bit values) in a mask may represent more than two status options, a value may represent various types or levels of connectivity or status information, e.g., no connectivity, limited connectivity, congestion, normal connectivity, preferred connectivity (e.g., a particular route weight), and/or other status information.

In some embodiments, status information may be stored and/or transmitted as values in a mask based on a known or discernable order, referred to herein as a mapping order or a masking order. For example, prior to receiving a mask representing status information for various Diameter peer nodes in a group 'DRA1-2' from DRA 101, DRA 101 may send a message indicating an order of group members for group 'DRA1-2'. In this example, a receiving entity may use the ordered list to process the mask and determine the appropriate Diameter peer status information, such as identifying the least significant bit as representing the status for the first element in the list, identifying the second least significant bit as representing the status for second element in the list, the third least significant bit as representing the status for third element in the list, and so on and so for.

For example, using the ordered list and the bitmask in row 1 of the table of FIG. 2, bitmask '0110' may indicate that DRA 101 has no connectivity with PCRF1.COM 116, has connectivity with PCRF2.EX.COM 118, has connectivity with PCRF3.CC.COM 120, and has no connectivity with PCRF4.CC.COM 122. In another example, using the ordered list and the bitmask in row 2 of the table of FIG. 2, bitmask '11' may indicate that DRA 101 has connectivity with PCEF1.EX.COM 108 and has connectivity with PCEF2.EX.COM 110. In another example, using the ordered list and the bitmask in row 3 of the table of FIG. 2, bitmask '011101' may indicate that DRA 102 has no connectivity with PCRF1.COM 116, has connectivity with PCRF2.EX.COM 118, has connectivity with PCRF3.CC.COM 120, has no connectivity with PCRF4.CC.COM 122, has connectivity with PCEF3.CC.COM 112, and has connectivity with PCEF4.CC.COM 114.

It will also be appreciated that Diameter peer status information 200 is for illustrative purposes and that additional data than the data depicted in FIG. 2 may be usable for storing, receiving, and/or transmitting Diameter peer status information. Further, Diameter peer status information 200 may be stored or managed using various data structures and/or computer readable media. Further, some Diameter peer status information 200 may be stored in separate and/or different locations. For example, group related information associated with DRA 101 may be stored at data storage 104 and group related information associated with DRA 102 may be stored at data storage 106.

Figure 3:
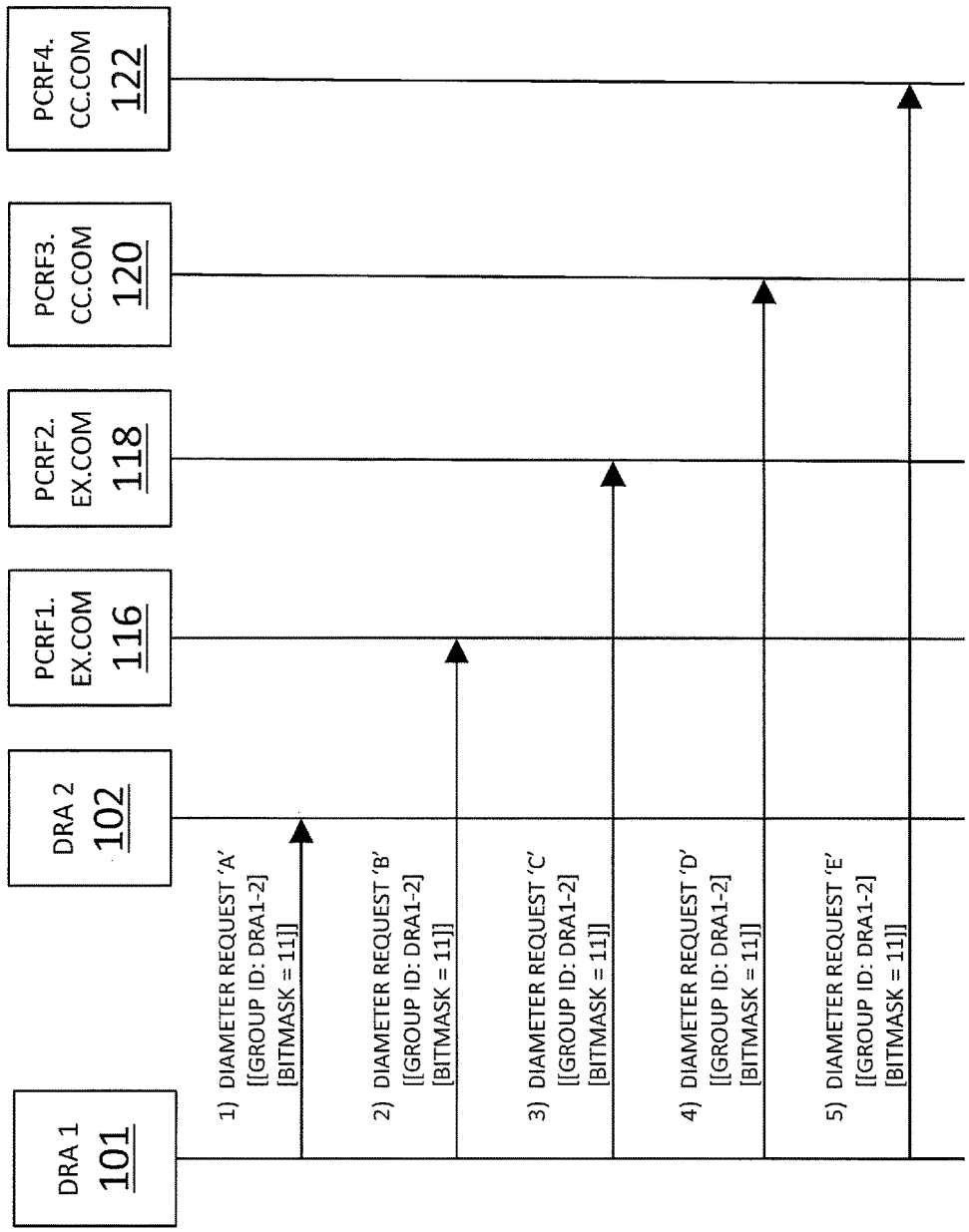
FIG. 3 is a diagram illustrating transmitting Diameter peer status information to a plurality of Diameter nodes according to an embodiment of the subject matter described herein.

FIG. 3 is a diagram illustrating transmitting Diameter peer status information to a plurality of Diameter nodes according to an embodiment of the subject matter described herein. In some embodiments, prior to transmitting or sending Diameter peer status information to a plurality of Diameter nodes, various mechanisms and/or Diameter entities may be usable for sending group related information and/or configuration data to the plurality of Diameter nodes such that the plurality of Diameter nodes can process, determine, and/or derive received Diameter peer status information.

In some embodiments, group related information and/or configuration information associated with Diameter peer status information may be sent using various messages and/or protocols, including proprietary and non-proprietary protocols and/or data formats. Some possible protocols for sending group related information and/or configuration data associated with Diameter peer status information may include a distributed routing and management application (DRMA) protocol, a hypertext transfer protocol (HTTP), a Diameter protocol, and/or other protocols.

Referring to FIG. 3, prior to step 1, DRA 101 may send group related information about group 'DRA1-2' to DRA 102, PCRF1.COM 116, PCRF2.EX.COM 118, PCRF3.CC.COM 120, and PCRF4.CC.COM 122. In this example, the group related information may indicate that the group is associated with an identifier 'DRA1-2' and that the group includes PCEF1.EX.COM 108 and PCEF2.EX.COM 110. Continuing with this example, DRA 102, PCRF1.COM 116, PCRF2.EX.COM 118, PCRF3.CC.COM 120, and PCRF4.CC.COM 122 may use this information for determining how to process, determine, and/or derive Diameter peer status information sent from DRA 101 regarding PCEF1.EX.COM 108 and PCEF2.EX.COM 110.

In some embodiments, group related information may be sent as one or more Diameter attribute value pairs (AVPs) or as a grouped Diameter AVP. For example, a grouped AVP may include a Diameter AVP for indicating a group identifier (e.g., 'DRA1-2') and may also include a Diameter AVP for indicating an ordered list of URIs representing PCEF1.EX.COM 108 and PCEF2.EX.COM 110. In this example, using the group related information, each recipient may be capable of discerning that a mask representing Diameter peer status information for group 'DRA1-2' would include two values (e.g., one value for each group member), where the first value in the mask represents the status of PCEF1.EX.COM 108 (e.g., the first URI in the ordered list) and the second value in the mask represents the status of PCEF2.EX.COM 110 (e.g., the second URI in the ordered list). In another example, other mechanisms, messages, and/or information may be used to indicate an order, algorithm, or technique for deriving or determining status information for Diameter peer nodes from mask values.

In some embodiments, after providing group related information to one or more recipients of Diameter peer status information, a status transmitting Diameter node may determine Diameter peer status information for various Diameter peer nodes (e.g., Diameter nodes that are communicatively coupled to the status transmitting Diameter node) and may then provide the Diameter peer status information to relevant Diameter entities, e.g., a group of recipients associated with the group identifier.

In step 1, a Diameter request message 'A' (e.g., a Diameter peer status update message) may be sent from DRA 101 to DRA 102. Diameter request message 'A' may include a group identifier 'DRA1-2' and a bitmask '11'. In some embodiments, the group identifier and the bitmask may be in a grouped Diameter AVP and/or individual Diameter AVPs.

After receiving Diameter request message 'A', DRA 102 may use group related information (e.g., provided by DRA 101) to derive Diameter peer status information. For example, DRA 102 may discern that bitmask '11' indicates that Diameter connectivity exists between DRA 101 and PCEF1.EX.COM 108 and that Diameter connectivity exists between DRA 101 and PCEF2.EX.COM 110.

In step 2, a Diameter request message 'B' (e.g., a Diameter peer status update message) may be sent from DRA 101 to PCRF1.COM 116. Diameter request message 'B' may include a group identifier 'DRA1-2' and a bitmask '11'.

After receiving Diameter request message 'B', PCRF1.EX.COM 116 may use group related information (e.g., provided by DRA 101) to derive Diameter peer status information. For example, PCRF1.COM 116 may discern that bitmask '11' indicates that Diameter connectivity exists between DRA 101 and PCEF1.EX.COM 108 and that Diameter connectivity exists between DRA 101 and PCEF2.EX.COM 110.

In step 3, a Diameter request message 'C' (e.g., a Diameter peer status update message) may be sent from DRA 101 to PCRF2.EX.COM 118. Diameter request message 'C' may include a group identifier 'DRA1-2' and a bitmask '11'.

After receiving Diameter request message 'C', PCRF2.EX.COM 118 may use group related information (e.g., provided by DRA 101) to derive Diameter peer status information. For example, PCRF2.EX.COM 118 may discern that bitmask '11' indicates that Diameter connectivity exists between DRA 101 and PCEF1.EX.COM 108 and that Diameter connectivity exists between DRA 101 and PCEF2.EX.COM 110.

In step 4, a Diameter request message 'D' (e.g., a Diameter peer status update message) may be sent from DRA 101 to PCRF3.CC.COM 120. Diameter request message 'D' may include a group identifier 'DRA1-2' and a bitmask '11'.

After receiving Diameter request message 'D', PCRF3.CC.COM 120 may use group related information (e.g., provided by DRA 101) to derive Diameter peer status information. For example, PCRF3.CC.COM 120 may discern that bitmask '11' indicates that Diameter connectivity exists between DRA 101 and PCEF1.EX.COM 108 and that Diameter connectivity exists between DRA 101 and PCEF2.EX.COM 110.

In step 5, a Diameter request message 'E' (e.g., a Diameter peer status update message) may be sent from DRA 101 to PCRF4.CC.COM 122. Diameter request message 'E' may include a group identifier 'DRA1-2' and a bitmask '11'.

After receiving Diameter request message 'E', PCRF4.CC.COM 122 may use group related information (e.g., provided by DRA 101) to derive Diameter peer status information. For example, PCRF4.CC.COM 122 may discern that bitmask '11' indicates that Diameter connectivity exists between DRA 101 and PCEF1.EX.COM 108 and that Diameter connectivity exists between DRA 101 and PCEF2.EX.COM 110.

It will be appreciated that FIG. 3 is for illustrative purposes and that additional steps than those depicted in FIG. 3 can be usable for transmitting Diameter peer status information. Additionally, it will be appreciated that steps depicted in FIG. 3 can occur in a different order than depicted or can be combined.

Further, it will be appreciated that transmitting Diameter peer status information may occur at various intervals and/or dynamically. For example, a status transmitting Diameter node (e.g., DRA 102 or PCRF3.CC.COM 120) may monitor or determine Diameter connectivity or other status related issues associated with Diameter peer nodes constantly and/or at various intervals (e.g., every 10 seconds, when network conditions or related thresholds are met, etc.). In this example, the status transmitting Diameter node may provide updated Diameter peer status information to recipients as changes occur, at various (e.g., periodic or aperiodic) intervals, and/or based on a network operator's preferences.

Figure 4:
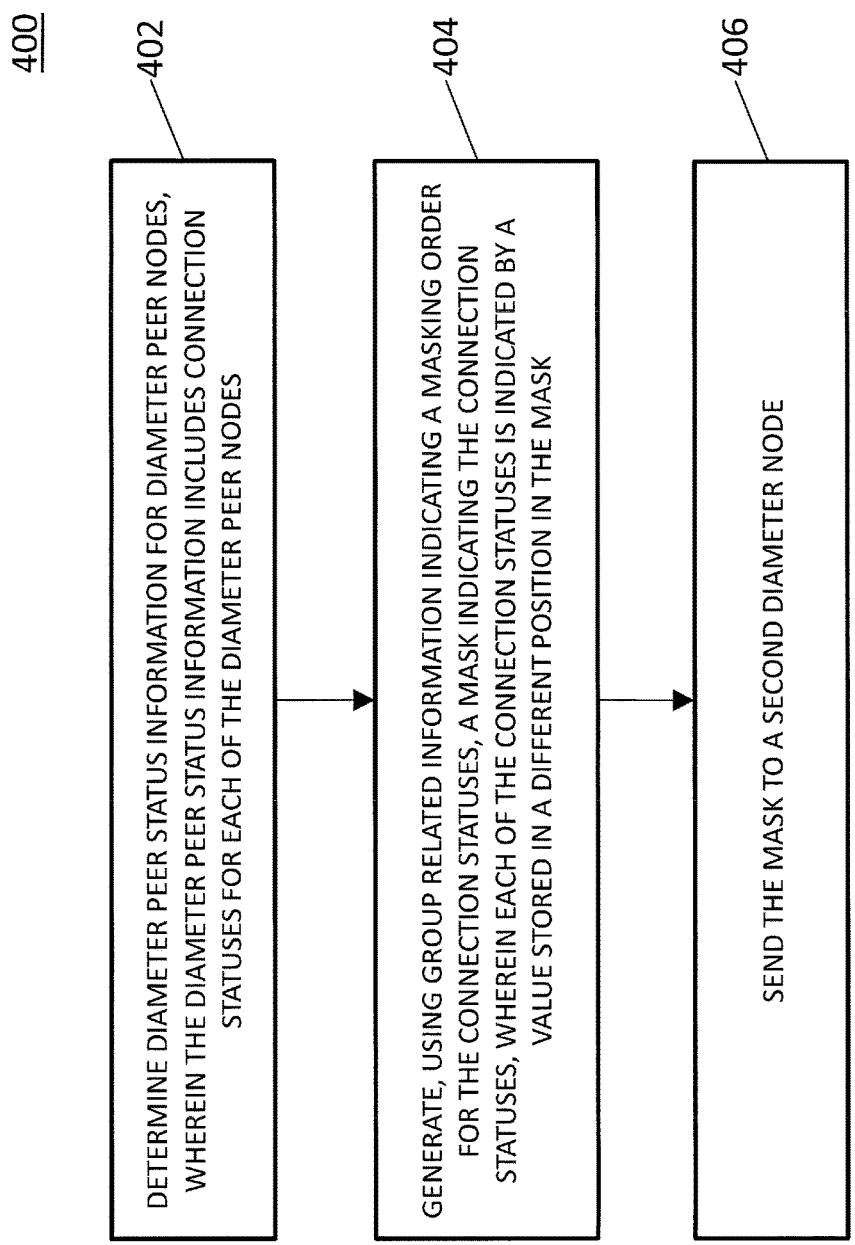
FIG. 4 is a diagram illustrating a process for transmitting Diameter peer status information according to an embodiment of the subject matter described herein.

FIG. 4 is a diagram illustrating a process 400 for transmitting Diameter peer status information according to an embodiment of the subject matter described herein. In some embodiments, process 400, or portions thereof (e.g., steps 402, 404, and/or 406), may be performed by or at DRA 101, DRA 102, and/or another node or module.

Referring to process 400, in step 402, Diameter peer status information may be determined for Diameter peer nodes. The Diameter peer status information may include connection statuses for each of the Diameter peer nodes. For example, Diameter peer status information may be determined by any suitable mechanism defined in RFC 6733.

In some embodiments, determining Diameter peer status information for Diameter peer nodes may include sending a message to a first Diameter peer node and determining whether a successful response message is received from the first Diameter peer node within an acceptable time period. For example, DRA 101 may send a Diameter request message (e.g., a Device-Watchdog-Request message) to PCRF1.COM 116. In this example, if DRA 101 receives a Diameter answer message (e.g., a Device-Watchdog-Answer message) within a certain time period (e.g., 20 seconds), DRA 101 may determine that Diameter connectivity between DRA 101 and PCRF1.COM 116 is available. Otherwise, in this example, DRA 101 may determine that Diameter connectivity between DRA 101 and PCRF1.COM 116 is unavailable.

In step 404, a mask indicating the connection statuses may be generated using group related information indicating a masking order for the connection statuses. Each of the connection statuses may be indicated by a value stored in a different position in the mask.

In some embodiments, a mask may include a set of values that represents Diameter peer status information where each value may be one or more bits. In some embodiments, a mask may be a bitmask, a bitmap, a multi-bitmask, a multi-bitmap, a byte mask, a byte map, a multi-byte mask, or a multi-byte map. In some embodiments, a mask may represent any mapping of data from one domain (e.g., words, numbers, etc.) into another domain (e.g., bits, bytes) and does not need to be used in bitwise operations, e.g., to mask other data.

In some embodiments, a connection status may indicate that Diameter connectivity between a first Diameter node and another Diameter node is available, that Diameter connectivity a first Diameter node and another Diameter node is unavailable, a connection weight (e.g., a routing weight or preference), a connection grade, a service level, or a particular connection issue (e.g., a value that represents a particular connection issue (e.g., congested) and is discernable by a recipient of Diameter peer status information).

In some embodiments, a value in a mask (e.g., that represents Diameter peer status information) may include one or more bits. For example, a byte mask may include values representing status information, where each value includes a byte or eights bits. In another example, a bitmask may include one or more bits, where each bit represents a particular Diameter peer node's status.

In step 406, the mask may be sent to a second Diameter node. For example, DRA 101 may send a Diameter message containing a mask representing connection statuses for Diameter peer nodes.

In some embodiments, prior to or concurrently with sending a mask (e.g., to a Diameter entity), group related information may be sent (e.g., to the Diameter entity) for processing the mask. For example, DRA 101 may provide a message containing group related information, such as a group identifier and an ordered list of group members, to DRA 102 which DRA 102 may use to process a mask and obtain connection statuses associated with the group members.

In some embodiments, a first Diameter node (e.g., that may perform process 400) may include a DRA, a Diameter routing agent, a Diameter relay agent, a Diameter redirect agent, a Diameter translation agent, a Diameter proxy agent, a PCRF, a PCEF, a packet gateway, a mobility management entity (MME), a home subscriber server (HSS), an online charging system (OCS), an offline charging system (OFCS), a traffic detection function (TDF), an application function (AF), a radio access network (RAN) Congestion Awareness Function (RCAF), an authentication, authorization, and accounting (AAA) server, or a bearer binding and event reporting function (BBERF). For example, DRAs 101-102, PCRFs 116-122, and/or other entities may determine and transmit Diameter peer status information to various recipients (e.g., Diameter entities).

In some embodiments, group related information may include a group identifier, identifiers for the Diameter peer nodes, and information for mapping mask values to the Diameter peer nodes. For example, group related information may include an ordered list of identities indicating various Diameter peer nodes in a group. In this example, the ordered list may represent a masking order indicating which value or position in a mask represents the status of a particular Diameter peer node.

In some embodiments, Diameter peer nodes may be determined based on a network operator, a location, a Diameter function, a uniform resource identifier portion, a domain, a realm, or a network. For example, a network operator may associate one or more PCRFs with a group. In another example, one or more Diameter nodes in a particular network or domain may be associated with a group.

In some embodiments, updated Diameter peer status information may be sent periodically, aperiodically, or dynamically. For example, DRA 101 may perform process 400 dynamically or at various intervals so as to provide updated Diameter peer status information as Diameter connectivity or status for Diameter peer nodes changes.

It will be appreciated that process 400 is for illustrative purposes and that different and/or additional actions may be used. It will also be appreciated that various actions described herein may occur in a different order or sequence.

It should be noted that DRA 101, DRA 102, and/or functionality described herein (e.g., peer status module 124) may constitute a special purpose computing device. Further, DRA 101, DRA 102, and/or functionality described herein can improve the technological field of Diameter communications by providing scalable mechanisms for distributing Diameter peer status information efficiently. Further, DRA 101, DRA 102, and/or functionality described herein can improve the technological field of status information distribution by utilizing groups and/or masks. By groups and/or masks when distributing Diameter peer status information, Diameter peer status information for certain Diameter entities may be transmitted to certain recipients, thereby reducing network traffic and bandwidth issues associated with broadcast transmissions. Further, by providing and using scalable mechanisms for transmitting Diameter peer status information to relevant recipients, the efficacy of a Diameter network is improved and re-routes and/or additional network traffic related to failed communications are minimized since Diameter entities are aware of Diameter peers' statuses and/or connectivity prior to attempting communications.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for transmitting Diameter peer status information, the method comprising:
   at a first Diameter node:
      grouping Diameter peer nodes into a group based on a network operator, a location, a Diameter function, a uniform resource identifier portion, a domain, a realm, or a network, wherein grouping the Diameter peer nodes into the group includes generating group related information including a group identifier;
      determining Diameter peer status information for the Diameter peer nodes, wherein the Diameter peer status information includes connection statuses for each of the Diameter peer nodes;
      generating, using the group related information indicating a masking order for the connection statuses, a bitmask indicating the connection statuses, wherein each of the connection statuses is indicated by a value stored in a different position in the bitmask, wherein each value in the bitmask indicates Diameter connectivity between the first Diameter node and a Diameter peer node is available or indicates Diameter connectivity between the first Diameter node and the Diameter peer node is unavailable; and
      sending the bitmask to a second Diameter node.

2. The method of claim 1 comprising:
   prior to or concurrently with sending the bitmask, sending, to the second Diameter node, the group related information for processing the bitmask.

3. The method of claim 2 wherein the group related information includes the group identifier, identifiers for the Diameter peer nodes, and information for mapping bitmask values to the Diameter peer nodes.

4. The method of claim 1 wherein the first Diameter node includes a Diameter routing agent, a Diameter relay agent, a Diameter redirect agent, a Diameter translation agent, a Diameter proxy agent, a policy and charging rules function (PCRF), a policy and charging enforcement node (PCEF), a mobility management entity (MME), a home subscriber server (HSS), an online charging system (OCS), an offline charging system (OFCS), a traffic detection function (TDF), an application function (AF), a radio access network (RAN) Congestion Awareness Function (RCAF), an authentication, authorization, and accounting (AAA) server, or a bearer binding and event reporting function (BBERF).

5. The method of claim 1 wherein determining the Diameter peer status information for the Diameter peer nodes includes:
   sending a message to a first Diameter peer node; and
   determining whether a successful response message is received from the first Diameter peer node within an acceptable time period.

6. The method of claim 1 wherein the connection status indicates a connection weight, a connection grade, a service level, or a particular connection issue.

7. The method of claim 1 wherein the bitmask is a bitmap, a multi-bitmask, or a multi-bitmap, and wherein each value in the bitmask includes one or bits.

8. The method of claim 1 wherein updated Diameter peer status information is sent periodically, aperiodically, or dynamically.

9. A system for transmitting Diameter peer status information, the system comprising:
a first Diameter node including:
a processor; and
a memory,
wherein the first Diameter node is configured to group Diameter peer nodes into a group based on a network operator, a location, a Diameter function, a uniform resource identifier portion, a domain, a realm, or a network, wherein grouping the Diameter peer nodes into the group includes generating group related information including a group identifier; determine Diameter peer status information for the Diameter peer nodes, wherein the Diameter peer status information includes connection statuses for each of the Diameter peer nodes, to generate, using the group related information indicating a masking order for the connection statuses, a bitmask indicating the connection statuses, wherein each of the connection statuses is indicated by a value stored in a different position in the bitmask, wherein each value in the bitmask indicates Diameter connectivity between the first Diameter node and a Diameter peer node is available or indicates Diameter connectivity between the first Diameter node and the Diameter peer node is unavailable, and to send the bitmask to a second Diameter node.

10. The system of claim 9 comprising:
prior to or concurrently with sending the bitmask, sending the group related information for processing the bitmask.

11. The system of claim 10 wherein the group related information includes the group identifier, identifiers for the Diameter peer nodes, and information for mapping bitmask values to the Diameter peer nodes.

12. The system of claim 9 wherein the first Diameter node includes a Diameter routing agent, a Diameter relay agent, a Diameter redirect agent, a Diameter translation agent, a Diameter proxy agent, a policy and charging rules function (PCRF), a policy and charging enforcement node (PCEF), a mobility management entity (MME), a home subscriber server (HSS), online charging system (OCS), an offline charging system (OFCS), a traffic detection function (TDF), an application function (AF), a radio access network (RAN) Congestion Awareness Function (RCAF), an authentication, authorization, and accounting (AAA) server, or a bearer binding and event reporting function (BBERF).

13. The system of claim 9 wherein determining the Diameter peer status information for the Diameter peer nodes includes:
sending a message to a first Diameter peer node; and
determining whether a successful response message is received from the first Diameter peer node within an acceptable time period.

14. The system of claim 9 wherein the connection status indicates a connection weight, a connection grade, a service level, or a particular connection issue.

15. The system of claim 9 wherein the bitmask is a bitmap, a multi-bitmask, or a multi-bitmap, and wherein each value in the bitmask includes one or bits.

16. The system of claim 9 wherein updated Diameter peer status information is sent periodically, aperiodically, or dynamically.

17. A non-transitory computer readable medium comprising computer executable instructions that when executed by a processor of a computer cause the computer to perform steps comprising:
at a first Diameter node:
grouping Diameter peer nodes into a group based on a network operator, a location, a Diameter function, a uniform resource identifier portion, a domain, a realm, or a network, wherein grouping the Diameter peer nodes into the group includes generating group related information including a group identifier;
determining Diameter peer status information for the Diameter peer nodes, wherein the Diameter peer status information includes connection statuses for each of the Diameter peer nodes;
generating, using the group related information indicating a masking order for the connection statuses, a bitmask indicating the connection statuses, wherein each of the connection statuses is indicated by a value stored in a different position in the bitmask, wherein each value in the bitmask indicates Diameter connectivity between the first Diameter node and a Diameter peer node is available or indicates Diameter connectivity between the first Diameter node and the Diameter peer node is unavailable; and
sending the bitmask to a second Diameter node.

18. The non-transitory computer readable medium of claim 17 comprising:
prior to or concurrently with sending the bitmask, sending, to the second Diameter node, the group related information for processing the bitmask.

* * * * *

UNITED STATES PATENT AND TRADEMARK OFFICE
CERTIFICATE OF CORRECTION

PATENT NO. : 10,103,955 B2
APPLICATION NO. : 14/873112
DATED : October 16, 2018
INVENTOR(S) : Renzullo et al.

Page 1 of 1

It is certified that error appears in the above-identified patent and that said Letters Patent is hereby corrected as shown below:

In the Specification

In Column 4, Line 40, delete "PCRF1.COM" and insert -- PCRF1.EX.COM --, therefor.

In Column 6, Line 42, delete "PCRF1.COM" and insert -- PCRF1.EX.COM --, therefor.

In Column 7, Line 30, delete "PCRF1.COM" and insert -- PCRF1.EX.COM --, therefor.

In Column 7, Line 40, delete "PCRF1.COM" and insert -- PCRF1.EX.COM --, therefor.

In Column 8, Line 14, delete "PCRF1.COM" and insert -- PCRF1.EX.COM --, therefor.

In Column 8, Line 19, delete "PCRF1.COM" and insert -- PCRF1.EX.COM --, therefor.

In Column 9, Line 1, delete "PCRF1.COM" and insert -- PCRF1.EX.COM --, therefor.

In Column 9, Line 6, delete "PCRF1.COM" and insert -- PCRF1.EX.COM --, therefor.

In Column 10, Line 18, delete "PCRF1.COM" and insert -- PCRF1.EX.COM --, therefor.

In Column 10, Line 22, delete "PCRF1.COM" and insert -- PCRF1.EX.COM --, therefor.

In Column 10, Line 24, delete "PCRF1.COM" and insert -- PCRF1.EX.COM --, therefor.

In the Claims

In Column 12, Line 64, in Claim 7, delete "one or bits" and insert -- one or more bits --, therefor.

In Column 14, Line 13, in Claim 15, delete "one or bits" and insert -- one or more bits --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*